(12) United States Patent
Ernst et al.

(10) Patent No.: US 8,957,948 B2
(45) Date of Patent: Feb. 17, 2015

(54) GEOMETRIC CALIBRATION OF HEAD-WORN MULTI-CAMERA EYE TRACKING SYSTEM

(75) Inventors: Jan Ernst, Plainsboro, NJ (US); Yakup Genc, Dayton, NJ (US)

(73) Assignee: Siemens Corporation, Iselin, NJ (US)

( * ) Notice: Subject to any disclaimer, the term of this patent is extended or adjusted under 35 U.S.C. 154(b) by 438 days.

(21) Appl. No.: 13/215,365

(22) Filed: Aug. 23, 2011

(65) Prior Publication Data
US 2012/0050493 A1    Mar. 1, 2012

Related U.S. Application Data

(60) Provisional application No. 61/376,318, filed on Aug. 24, 2010.

(51) Int. Cl.
| | |
|---|---|
| H04N 13/02 | (2006.01) |
| H04N 15/00 | (2006.01) |
| G09G 5/00 | (2006.01) |
| H04N 13/04 | (2006.01) |
| G02B 27/01 | (2006.01) |

(52) U.S. Cl.
CPC ............ H04N 13/044 (2013.01); *G02B 27/017* (2013.01); *H04N 13/0484* (2013.01); *G02B 2027/0138* (2013.01); *G02B 2027/014* (2013.01)
USPC .................................. 348/47; 348/48; 345/8

(58) Field of Classification Search
CPC .......... H04N 13/0239; H04N 13/0296; H04N 13/0055; G02B 27/017; G02B 27/0172; G02B 2027/0132
USPC ............................................ 348/47, 48; 345/8
See application file for complete search history.

(56) References Cited

U.S. PATENT DOCUMENTS

| | | | | |
|---|---|---|---|---|
| 6,120,461 | A * | 9/2000 | Smyth | 600/558 |
| 6,411,266 | B1 * | 6/2002 | Maguire, Jr. | 345/8 |
| 2006/0232665 | A1 * | 10/2006 | Schowengerdt et al. | 348/51 |

* cited by examiner

Primary Examiner — Chikaodili E Anyikire (57) ABSTRACT

A system and methods for geometric calibration and use of head-worn multi-camera eye tracking system are provided. The system calibrates the internal and external parameters of the cameras as well as the parameters of a compact geometric model of the human eye. An exo-camera determines a relative pose with regard to a computer monitor and endo-cameras determine the eyeball position and orientation. An endo-exo calibration and an endo-eye calibration each with an optimization step are included. A homography and a joint optimization step are also provided. A single point calibration re-establishes calibration. The system in operational mode determines a user's gaze direction to perform a computer input function.

17 Claims, 6 Drawing Sheets

GEOMETRIC CALIBRATION OF HEAD-WORN MULTI-CAMERA EYE TRACKING SYSTEM

CROSS REFERENCE TO RELATED APPLICATIONS

The present application claims the benefit of U.S. Provisional Patent Application Ser. No. 61/376,318 filed on Aug. 24, 2010, which is incorporated by reference herein in its entirety.

BACKGROUND OF THE INVENTION

The present invention relates to calibration of a user-wearable multi-camera system. More specifically, this invention relates to calibration that includes a pose of the multi-camera system with respect to the user.

Augmented vision, also referred to as augmented reality or augmented reality vision, augments a user's view of the real world with superimposed computer generated graphical information. This information may be include, for example, a text label attached to some object in the scene, or a three-dimensional (3D) model of a patient's brain, derived from an MRI scan, and aligned to the real view of the person's head.

The user may observe the real world directly with his or her eyes, and the additional graphics information is blended in via a semi-transparent display located between the observer and the real scene. Such a display device can, for example, be an optical see-through head mounted display. The display can also be opaque, like a computer screen or a non-see-through head mounted display. It then presents to the user the complete augmented view, a combination of the real-world view and the graphics overlay. A video camera takes the place of the real-world observer to capture the real world-view. Two cameras may be implemented for stereo vision. A computer may be used to combine the live video with the graphics augmentation. A display device of this kind is, for example, a video-see-through head-mounted display.

The graphics are positioned, oriented, and scaled, or even rendered in a perspective fashion for correct alignment with the real-world view. To achieve precise alignment of the real and virtual view, the graphics may be anchored to a real-world object. For this knowledge of the position and orientation of the user's viewpoint is needed with respect to this object, and the orientation of the object. Thus, the relationship between two coordinate systems needs to be defined, one attached to the user's head, the other attached to the object.

Tracking denotes the process of keeping track of this relationship. Commercial tracking systems are available based on optical, magnetic, ultrasound, and mechanical means.

Calibration is needed to achieve correct alignment between virtual graphics objects and real objects in the scene. Calibrating a video-see-through head-mounted-display (HMD) can be done in an objective way, independent of a user, as real and virtual images are combined in the computer. In contrast, with an optical-see-through HMD the combination of the real and virtual images takes place finally in the user's eye, and the position of the user's eye behind the semi-transparent screen has critical influence on the alignment.

Different methods for calibrating an optical-see-through HMD are known as prior art. All known calibration methods require the user to align virtual structures with real reference structures. For example, in one method the user is shown a sequence of fixed graphical markers on the display and moves the head to bring them into alignment with a reference marker in the real scene.

In many applications one does not want a HMD in a wearable camera frame. One requirement is to accurately correlate a gaze from a wearer and a position of a camera worn by the wearer with a coordinate or a location in space. For vision applications needing both precise measurements and comfortable use, no known system currently exists that calibrates the pose of the head-worn multi-camera both to the external world and to the user, in particular to the eyeball position and orientation.

Registration and/or calibration systems and methods are disclosed in U.S. Pat. Nos. 7,639,101; 7,190,331 and 6,753,828. Each of these patents are hereby incorporated by reference.

Accordingly, a need exists for improved and novel systems and methods for calibration of a head-worn multi-camera both to the external world and to the user, in particular to the eyeball position.

SUMMARY

In accordance with an aspect of the present invention methods and systems are provided to calibrate a frame worn by a wearer containing an exo-camera directed to a display and a first and a second endo-camera, each directed to an eye of the wearer.

In accordance with an aspect of the present invention a method is provided for calibrating a frame worn by a wearer containing an exo-camera directed to a display and a first and a second endo-camera, each directed to an eye of the wearer, comprising a processor collecting data related to a projection of an image on the display with a known set of 3D coordinates in coordinates of the exo-camera and in coordinates of the endo-camera as an exo-endo pair, the processor optimizing a relative pose of the exo-endo pair as a set of rotation and translation parameters which minimizes an error criterion, the processor estimating parameters of a geometric model of the eye while it focuses on a known location in the 3D screen space, and the processor minimizing a gaze projection error on the display with regard to a known ground truth.

In accordance with a further aspect of the present invention the method is provided, wherein a first exo-camera and endo-camera pair is formed for the first endo-camera and a second exo-camera and endo-camera pair is formed for the second endo-camera.

In accordance with yet a further aspect of the present invention the method is provided, wherein the processor determines a relative transformation between an endo-camera coordinate system and an exo-camera coordinate system.

In accordance with yet a further aspect of the present invention the method is provided, wherein the relative transformation is expressed as $p^x = R^{ex} p^e + t^{ex}$ wherein $R^{ex} \in SO(3)$ is a rotation matrix, wherein $SO(3)$ is a rotation group, $t^{ex} \in R^3$ is a translation vector, $p^x \in R^3$ is a vector of points in the exo camera coordinate system, and $p^e \in R^3$ is a vector of points in the endo camera coordinate system.

In accordance with yet a further aspect of the present invention the method is provided, wherein calibration grids $G^e$, $G^x$ are placed around the endo-exo camera system such that $G^x$ is visible in the exo camera image and $G^e$ is visible in the endo camera image.

In accordance with yet a further aspect of the present invention the method is provided, wherein for each image establishing an exo-camera and endo-camera pair external pose matrices $T_n^e \in R^4 \times R^4$ and $T_n^x \in R^4 \times R^4$ are estimated from marked projected calibration points, wherein $T_n^e$ is a endo-camera external pose matrix for image pair n, and $T_n^x$ is a exo-camera external pose matrix for image pair n.

In accordance with yet a further aspect of the present invention the method is provided, wherein the error criterion is determined by an optimization of an expression $$\sigma^2 = \sum_{n=1}^{N} [\{\text{Var}(p_n^x)\}], \ p_n^x = (T_n^x)^{-1} \tilde{T}^{ex} T_n^e p^e,$$

wherein $\tilde{T}^{ex}$ is an estimation of $T^{ex} \in R^4 \times R^4$ which is a transformation matrix for homogeneous coordinates.

In accordance with yet a further aspect of the present invention the method is provided, wherein parameters of the geometric model of the eye include an orientation of the eye and a position of a center location of the eye.

In accordance with yet a further aspect of the present invention the method is provided, wherein the processor estimates the parameters of the of the geometric model of the eye by minimizing a projection error of an estimated intersection point of the direction of gaze with the display relative to an actual intersection point.

In accordance with yet a further aspect of the present invention the method is provided, further comprising minimizing a residual error between an estimated location on a display and an actual location on a display by estimating a homography.

In accordance with yet a further aspect of the present invention the method is provided, wherein the estimated homography is expressed as d=Hd̄, wherein d is the actual location on the display, d̄ is the estimated location on the display, and H is a matrix that determines a homography.

In accordance with yet a further aspect of the present invention the method is provided, wherein the minimizing of the projection error generates estimated parameters that calibrate the frame relative to the display.

In accordance with yet a further aspect of the present invention the method is provided, wherein the estimated parameters are $\tilde{T}^{ex}$, $\tilde{c}$ and $\tilde{r}$, wherein $\tilde{T}^{ex}$ is an estimation of a transformation matrix for homogeneous coordinates, $\tilde{c}$ is an estimate of a center of the eye and $\tilde{r}$ is an estimate of a radius of the eye.

In accordance with yet a further aspect of the present invention the method is provided, further comprising the wearer after calibration looking at the screen and the processor determining from a post calibration exo-camera image and endo-camera image pair a coordinate on the display.

In accordance with yet a further aspect of the present invention the method is provided, wherein a gaze of the wearer is applied to provide a command to a computing device.

In accordance with yet a further aspect of the present invention the method is provided, further comprising the processor determining that re-calibration is needed based on a performance criterion, the processor determining an endo and an exo camera pair of a user's gaze to a single calibration point, the processor determining a reprojection of the user's gaze to the single calibration point and the processor determining an correction vector based on coordinates of the single calibration point and coordinates of the reprojection of the user's gaze to the single calibration point.

In accordance with yet a further aspect of the present invention the method is provided, wherein the processor further calibrates the frame in accordance with the correction vector.

In accordance with an aspect of the present invention a system is provided to calibrate a frame worn by a wearer containing an exo-camera directed to a display and a first and a second endo-camera, each directed to an eye of the wearer, comprising the frame worn by the wearer, a processor enabled to execute instructions to perform the steps: collecting data related to a projection of an image on the display with a known set of 3D coordinates in coordinates of the exo-camera and in coordinates of the endo-camera as an exo-endo pair, optimizing a relative pose of the exo-endo pair as a set of rotation and translation parameters which minimizes an error criterion, estimating parameters of a geometric model of the eye while it focuses on a known location in the 3D screen space and minimizing a gaze projection error on the display with regard to a known ground truth.

In accordance with an aspect of the present invention the system is provided, wherein the processor is enabled to execute instructions to perform a single calibration point alignment.

DESCRIPTION OF PREFERRED EMBODIMENTS

Figure 1:
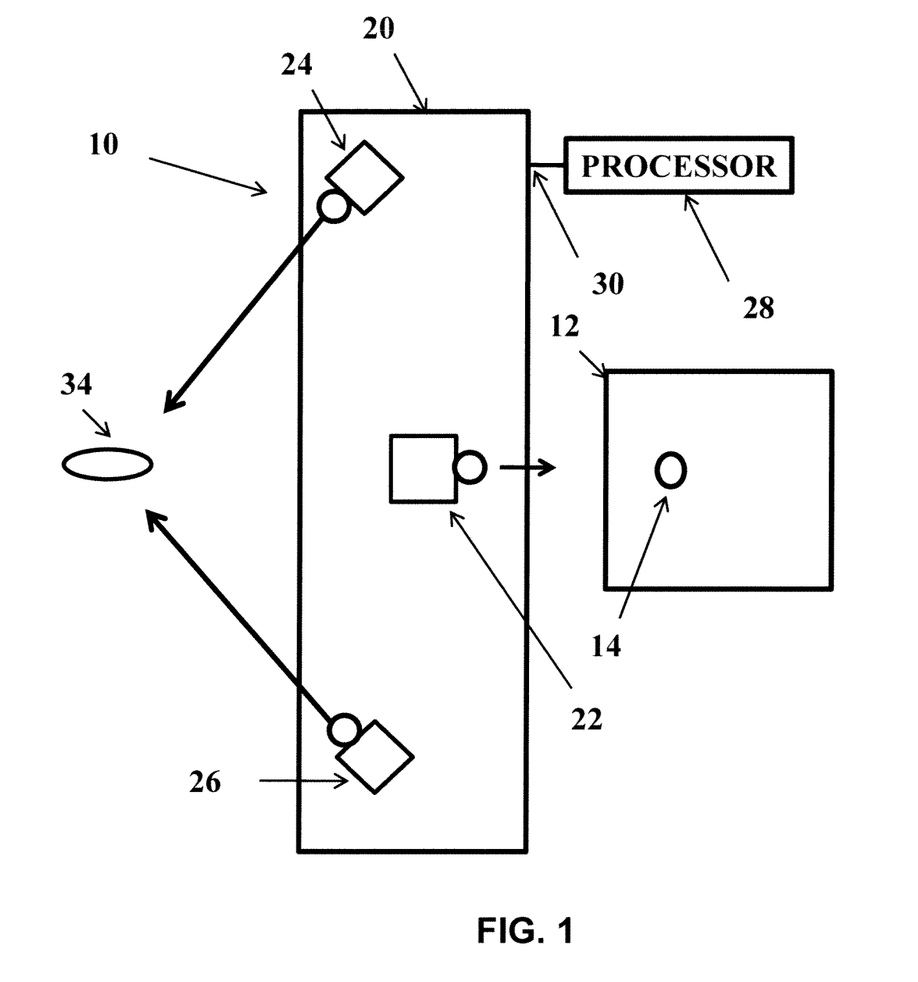
FIG. 1 is an illustration of a video-see-through augmented reality calibration system.

FIG. 1 illustrates a head worn, multi camera eye tracking system. A computer display 12 is provided. A calibration point 14 is provided at various locations on the display 12. A head worn, multi-camera device 20 can be a pair of glasses. The glasses 20 include an exo-camera 22, a first endo-camera 24 and a second endo-camera 26. Images from each of the cameras 22, 24 and 26 are provided to a processor 28 via output 30. The endo-cameras 24 and 26 are aimed at a user's eye 34. The endo camera 24 is aimed away from the user's eye 34. During calibration in accordance with an aspect of the present invention the endo-camera is aimed toward the display 12.

Figure 2:
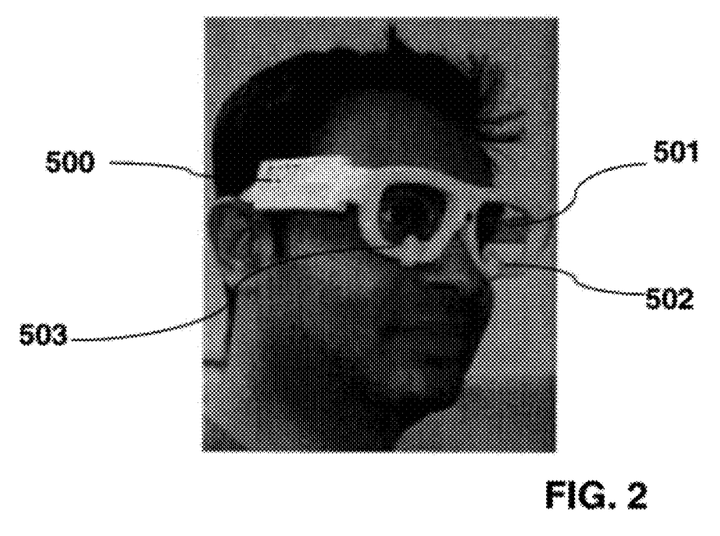
FIGS. 2 to 4 are images of a head-worn-multi-camera system that is used in accordance with an aspect of the present invention.
Figure 3:
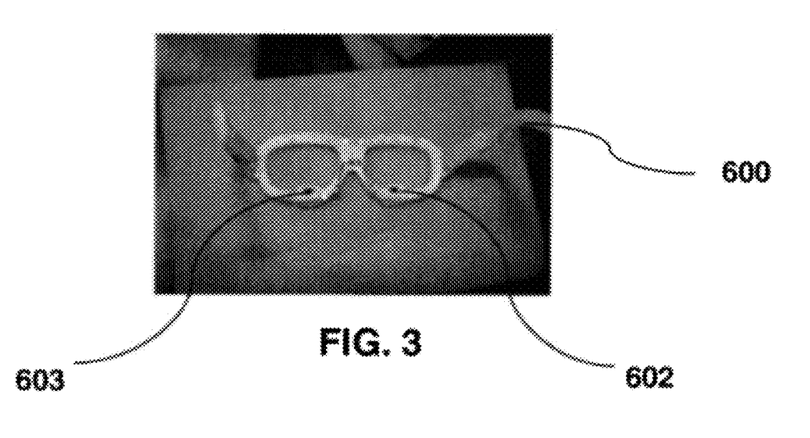
Figure 4:
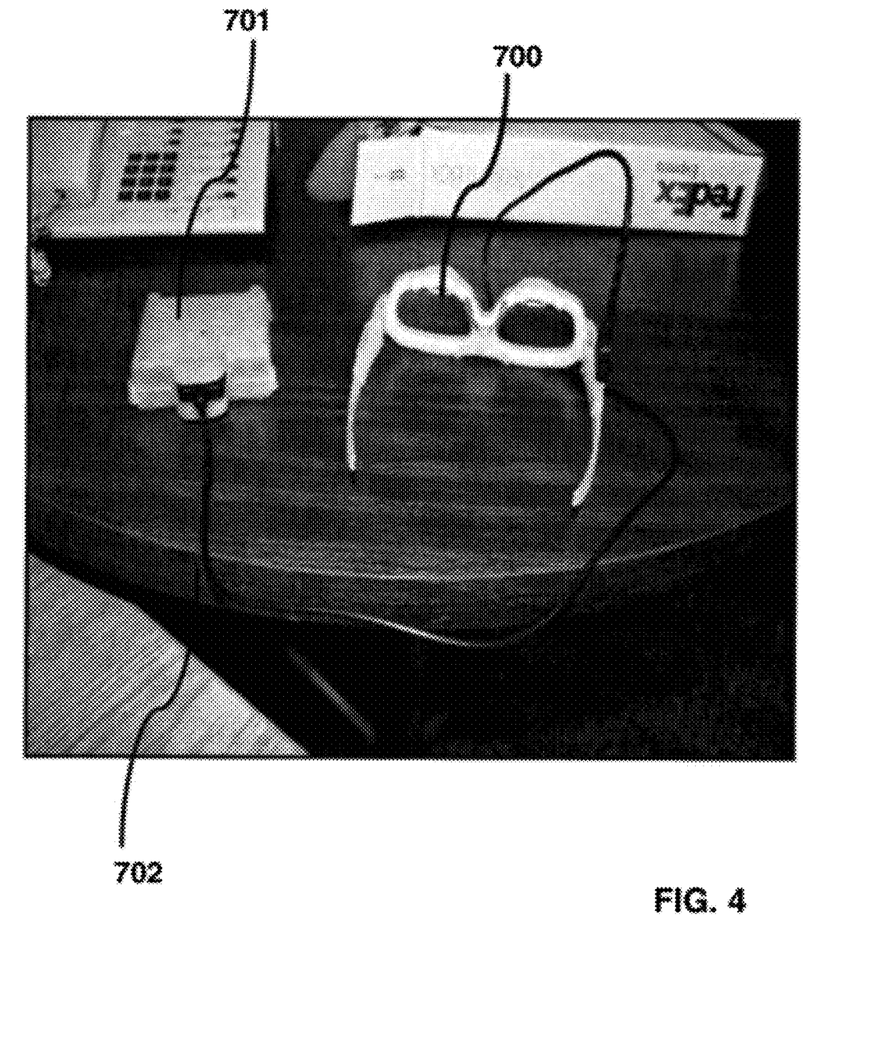

Next a method for geometric calibration of head-worn multi-camera eye tracking system as shown in FIG. 1 in accordance with an aspect of the present invention will be described An embodiment of the glasses 20 is shown in FIGS. 2-4. A frame with endo and exo cameras is shown in FIG. 2. Such a frame is available from Eye-Com Corporation in Reno, Nev. The frame 500 has an exo-camera 501 and two endo-cameras 502 and 503. While the actual endo-cameras are not visible in FIG. 2, the housings of the endo-cameras 502 and 503 are shown. An internal view of a similar but newer version of a wearable camera set is shown in FIG. 3. The endo-cameras 602 and 603 in the frame 600 are clearly shown in FIG. 3. FIG. 4 shows a wearable camera 700 with exo camera and endo cameras connected through a wire 702 to a receiver of video signals 701. Unit 701 may also contain a power source for the camera and a processor 28. Alternatively, the processor 28 can be located anywhere. In a further embodiment of the present invention video signals are transmitted wirelessly to a remote receiver.

In accordance with an aspect of the present invention it is desired to accurately determine where a wearer of the head-worn camera is looking. For instance, in one embodiment of the present invention a wearer of the head-worn camera is positioned between about 2 feet and 3 feet, or between 2 feet and 5 feet, or between 2 feet and 9 feet away from a computer screen which may include a keyboard, and in accordance with an aspect of the present invention, the system determines coordinates in calibrated space where the gaze of the wearer is directed at on the screen or on the keyboard or elsewhere in a calibrated space.

As already described, there are two sets of cameras. The exo-camera 22 relays information about the pose of the multi-camera system with respect to the world, and the endo-cameras 24 and 26 relay information about the pose of the multi-camera system with respect to the user and the sensor measurements for estimating the geometric model.

Several methods of calibrating the glasses are provided herein. The first method is a two step process. The second method of calibration relies on the two step process and then uses a homography step. The third method of calibration processes the two steps at the same time rather than at separate times.

Method 1—Two Step

The method 1 commences system calibration in two consecutive steps, namely endo-exo and endo-eye calibration.

First Step of Method 1: Endo-Exo Calibration

With the help of two disjoint calibration pattern, i.e. fixed points in 3D with precisely known coordinates, a set of exo- and endo-camera frame pairs are collected and the projections of the 3D-positions of the known calibration points are annotated in all images. In an optimization step, the relative pose of each exo- and endo-camera pair is estimated as the set of rotation and translation parameters minimizing a particular error criterion.

The endo-exo calibration is performed per eye, i.e. once on the left eye and then again on the right eye separately.

In the first step of method 1, the relative transformation between endo camera coordinate system and exo camera coordinate system is established. In accordance with an aspect of the present invention, the parameters $R^{ex}$, $t^{ex}$ in the following equation are estimated:

$$p^x = R^{ex} p^e + t^{ex}$$

where $R^{ex} \in SO(3)$ is a rotation matrix, wherein SO(3) is the rotation group as known in the art, $t^{ex} \in R^3$ is a translation vector between the endo and exo camera coordinate system, $p^x \in R^3$ is a point in the exo camera coordinate system, $p^x \in R^3$ is a vector of points in the exo camera coordinate system, $p^e \in R^3$ is a point in the endo camera coordinate system, and $p^e \in R^3$ is a vector of points in the endo camera coordinate system.

In the following, the pair $R^{ex}$, $t^{ex}$ is consumed in the homogeneous matrix $T^{ex} \in R^4 \times R^4$ which is constructed from $R^{ex}$ via Rodrigues' formula and concatenation of $t^{ex}$. The matrix $T^{ex}$ is called a transformation matrix for homogeneous coordinates. The matrix $T^{ex}$ is constructed as follows:

$$T^{ex} = \begin{bmatrix} R^{ex} & t^{ex} \\ 0 \ 0 \ 0 & 1 \end{bmatrix},$$

which is a concatenation of $t^{ex}$ and $[0\ 0\ 0\ 1]^T$, which is a standard textbook procedure.

The (unknown) parameters of $T^{ex}$ are estimated as $\tilde{T}^{ex}$ by minimizing an error criterion as follows:

1. Two disjoint (i.e. not rigidly coupled) calibration reference grids $G^e$, $G^x$ have M markers applied at precisely known locations spread in all three dimensions;
2. The grids $G^e$, $G^x$ are placed around the endo-exo camera system such that $G^x$ is visible in the exo camera image and $G^e$ is visible in the endo camera image;
3. An exposure each of endo and exo camera is taken;
4. The endo and exo camera system is rotated and translated into a new position without moving the grids $G^e$, $G^x$ such that the visibility condition in step 2 above is not violated;
5. Steps 3 and 4 are repeated until N (double, i.e. exo/endo) exposures are taken.
6. In each of the N exposures/images and for each camera (endo, exo) the imaged locations of the markers are annotated, resulting in the M×N marked endo image locations $l_{n,m}^e \in R^2$ and the M×N marked exo image locations $l_{n,m}^x \in R^2$.
7. For each of the N exposures/images and for each camera (endo, exo) the external pose matrices $T_n^e \in R^4 \times R^4$ and $T_n^x \in R^4 \times R^4$ are estimated from the marked image locations of step 6 and their known groundtruth from step 1 via an off-the-shelf external camera calibration module.
8. The optimization criterion is derived by looking at the following equation transforming a world point $p^e$ in the endo grid $G^e$ coordinate system into the point $p^x$ in the exo grid $G^x$ coordinate system: $p^x = G p^e$, where G is the unknown transformation from the endo to the exo grid coordinate system. Another way to write this is:

$$p^x = (T_n^x)^{-1} T^{ex} T_n^e p^e \forall n \tag{1}$$

In other words the transformation $(T_n^x)^{-1} T^{ex} T_n^e$ is the unknown transformation between the two grid coordinate systems. The following follows directly: $\tilde{T}^{ex}$ is a correct estimate of $T^{ex}$ if all points $\{p^e\}$ are always transformed via equation 1 into the same points $\{p^x\}$ for all N instances $(T^x, T^e)_n$.

Consequently the error/optimization/minimization criterion is posed in a fashion that it favors $\tilde{T}^{ex}$ where the resulting $p^x$ are close together for each member of the set $\{p^x\}$, such as the following:

$$\sigma^2 = \Sigma / \{Var(p^x)\}], p_n^x = (T_n^x)^{-1} \tilde{T}^{ex} T_n^e p^3. \tag{2}$$

These steps just described are performed for the pair of cameras 22 and 24 and for the pair of cameras 22 and 26.

Second Step of Method 1: Endo-Eye Calibration

Next, an endo-eye calibration is performed for each calibration pair determined above. In accordance with an aspect of the present invention, the endo-eye calibration step consists of estimating the parameters of a geometric model of the human eye, its orientation and the position of the center location. This is performed after the endo-exo calibration is available by collecting a set of sensor measurements comprising the pupil center from the endo-cameras and the corresponding external pose from the exo-camera while the user focuses on a known location in the 3D screen space.

An optimization procedure minimizes the gaze re-projection error on the monitor with regard to the known ground truth.

The purpose is to estimate the relative position of the eyeball center $c \in R^3$ in the endo eye camera coordinate system and the radius r of the eyeball. The gaze location on a monitor is calculated in the following fashion given the pupil center l in the endo eye image:

The steps include:
1. Determine the intersection point a of the projection of l into world coordinates with the eyeball surface;

2. Determine the direction of gaze in the endo camera coordinate system by the vector a-c;
3. Transform the direction of gaze from step 2 into the exo world coordinate system by the transformation obtained/estimated in the earlier section;
4. Establish the transformation between the exo camera coordinate system and a monitor by e.g. a marker tracking mechanism;
5. Determine the intersection point d of the vector from step 3 with the monitor surface given the estimated transformation of step 4.

The unknowns in the calibration step are the eyeball center c and the eyeball radius r. They are estimated by gathering K pairs of screen intersection points d and pupil centers in the endo image l: $(d; l)_k$. The estimated parameters $\tilde{c}$ and $\tilde{r}$ are determined by minimizing the reprojection error of the estimated $\tilde{d}$ versus the actual ground truth locations d, e.g.

$$\min E(|d-\tilde{d}|) \quad (3)$$

with some metric E. The sought eyeball center $\tilde{c}$ and eyeball radius $\tilde{r}$ estimates then are the ones that minimize equation 3.

The ground truth is provided by predetermined reference points, for instance as two different series of points with one series per eye, that are displayed on a known coordinate grid of a display. In one embodiment of the present invention the reference points are distributed in a pseudo-random fashion over an area of the display. In another embodiment of the present invention the reference points are displayed in a regular pattern.

The calibration points are preferably distributed in a uniform or substantially uniform manner over the display to obtain a favorable calibration of the space defined by the display. The use of a predictable or random calibration pattern may depend on a preference of a wearer of the frame. However, preferably, all the points in a calibration pattern should not be co-linear.

A system as provided herein preferably uses at least or about 12 calibration points on the computer display. Accordingly, at least or about 12 reference points in different locations for calibration are displayed on the computer screen. In a further embodiment of the present invention more calibration points are used. For instance at least 16 points or at least 20 points are applied. These points may be displayed at the same time, allowing the eye(s) to direct the gaze to different points. In a further embodiment of the present invention fewer than twelve calibration points are used. For instance, in one embodiment of the present invention two calibration points are used. Selection of the number of calibration points is in one aspect based on the convenience or comfort of the user, wherein a high number of calibration points may form a burden to the wearer. A very low number of calibration points may affect the quality of use. It is believed that a total number of 10-12 calibration points in one embodiment of the present invention is a reasonable number. In a further embodiment of the present invention only one point at a time is displayed during calibration.

Method 2—Two Step and Homography

The second method of the present invention uses the two steps above and a homography step. This method uses method 1 as an initial processing step and improves the solution by estimating an additional homography between the estimated coordinates in the screen world space from method 1 and the ground truth in the screen coordinate space. This generally addresses and diminishes systematic biases in the former estimation, thus improving the re-projection error.

This method is based on the estimated variables of method 1, i.e. it supplements method 1. After the calibration steps in section 1 have commenced, there is typically a residual error in the projected locations $\tilde{d}$ versus the true locations d. In a second step this error is minimized by modeling the residual error as a homography H, i.e. $d=H\tilde{d}$. The homography is readily estimated by standard methods with the set of pairs (d, $\tilde{d}$) of the previous section and then applied to correct for the residual error. Homography estimation is for instance described in U.S. Pat. No. 6,965,386 to Appel et al issued on Nov. 15, 2005 and U.S. Pat. No. 7,321,386 to Mittal et al. issued on Jan. 22, 2008 which are both incorporated herein by reference.

Homography is known to one of ordinary skill and is described for instance in Richard Hartley and Andrew Zisserman: "Multiple View Geometry in Computer Vision", Cambridge University Press, 2004.

Method 3—Joint Optimization

This method addresses the same calibration problem by jointly optimizing the parameters of the endo-exo and the endo-eye space at the same time rather than individually. The same reprojection error of the gaze direction in the screen space is used. The optimization of the error criterion proceeds over the joint parameter space of the endo-exo as well as the endo-eye geometry parameters.

This method treats the endo-exo calibration as described above as part of method 1 as well as the endo-eye calibration as described above as part of method 1 jointly as one optimization step. The basis for optimization is the monitor reprojection error criterion in equation (3). The estimated variables specifically are $T^{ex}$; c and r. Their estimates $\tilde{T}^{ex}$, $\tilde{c}$ and $\tilde{r}$ are the solutions to minimizing the reprojection error criterion as output from any off-the-shelf optimization method.

Specifically this entails:
1. Given a set of known monitor intersection points d and the associated pupil center location in the endo image l, i.e. (d, l)$_k$, calculate the reprojection error for the reprojected gaze locations $\tilde{d}$. The gaze location is reprojected by the method described above related to the Endo-eye calibration.
2. Employ an off-the-shelf optimization method to find the parameters $\tilde{T}^{ex}$, $\tilde{c}$ and $\tilde{r}$ that minimize the reprojection error of step 1.
3. The estimated parameters $\tilde{T}^{ex}$, $\tilde{c}$ and $\tilde{r}$ are then the calibration of the system and can be used to reproject a novel gaze direction.

Figure 5:
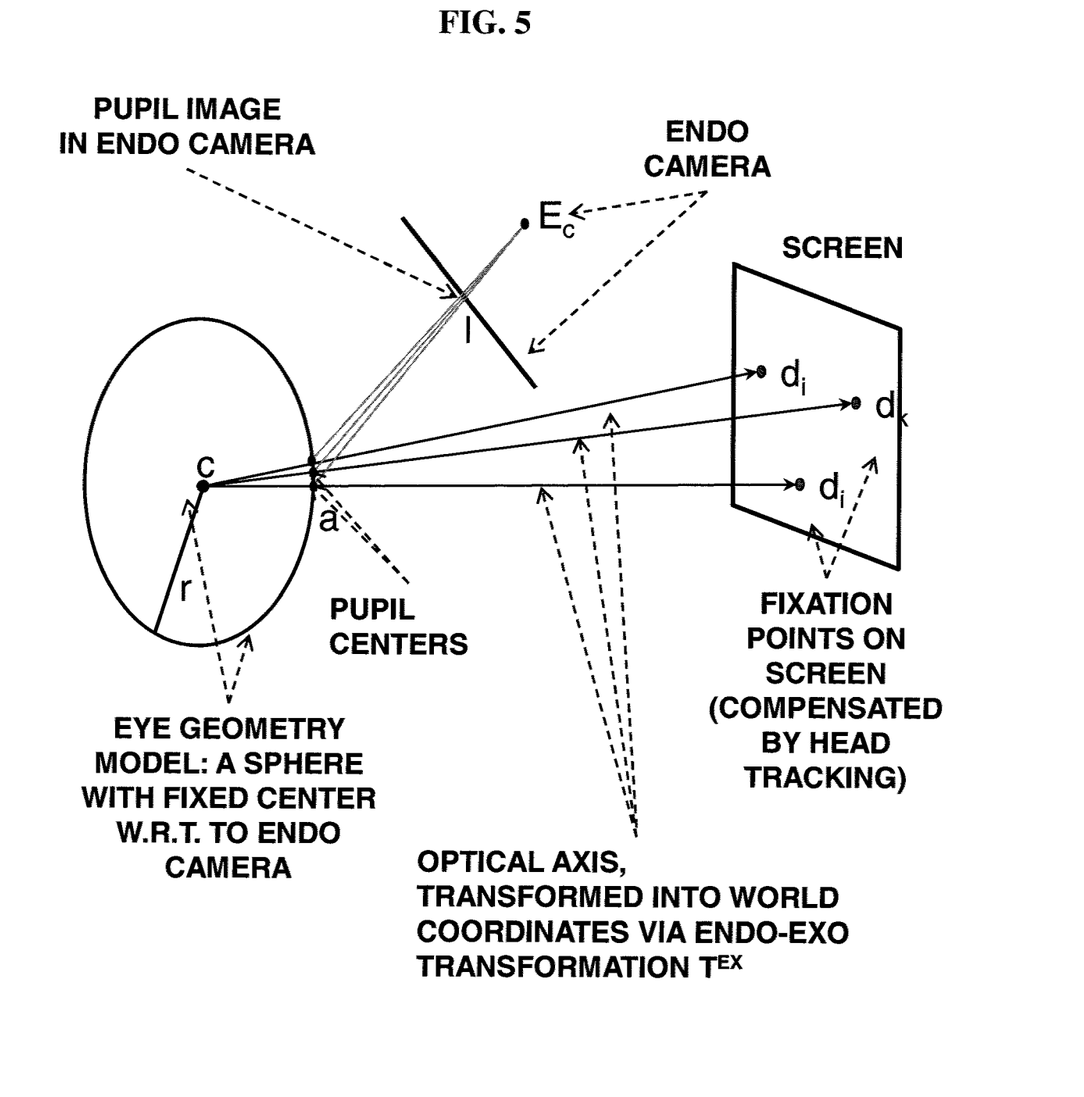
FIG. 5 provides a model of an eyeball with regard to an endo-camera in accordance with an aspect of the present invention.

A diagram of a model of an eye related to an endo camera is provided in FIG. 5. It provides a simplified view of the eye geometry. The location of fixation points are compensated at different instances by the head tracking methods as provided herein and are shown at different fixation points $d_i$, $d_j$ and $d_k$ on a screen.

Online One-Point Re-Calibration

In accordance with an aspect of the present invention a method is provided to improve calibration performance over time and enable additional system capabilities, resulting in improved user comfort, including (a) longer interaction time via simple on-line recalibration; and ability to take eye frame off and back on again without having to go through a full recalibration process.

For the on-line recalibration, a simple procedure is initiated as described below to compensate calibration errors such as for accumulative for accumulative calibration errors due frame movement (which may be a moving eye-frame either due to extended wear time or taking the eye frame off and back on, for instance).

Method

The one-point calibration estimates and compensates for a translational bias in screen coordinates between the actual gaze location and the estimated gaze location independently of any previous calibration procedure.

The re-calibration process can be initiated either manually, for instance when the user notices the need for recalibration, e.g. due to lower than normal tracking performance. The re-calibration process can also be initiated automatically, for instance when the system infers from the user's behavioral pattern that the tracking performance is dropping (e.g., if the system is being used to implement typing, a lower than normal typing performance may indicate the need to re-calibrate), or simply after a fixed amount of time.

The one-point calibration occurs after for instance full calibration as described above has been performed. However, as stated before, the one-point calibration is independent of which calibration method was applied.

Figure 6:
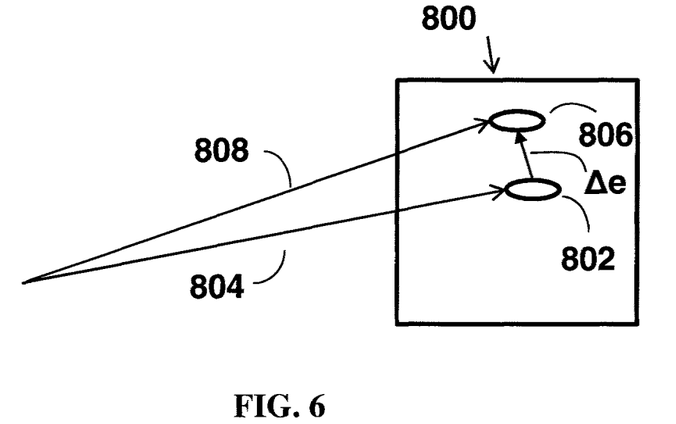
FIG. 6 illustrates a one step calibration step that can be used after the initial calibration is performed.
Figure 7:
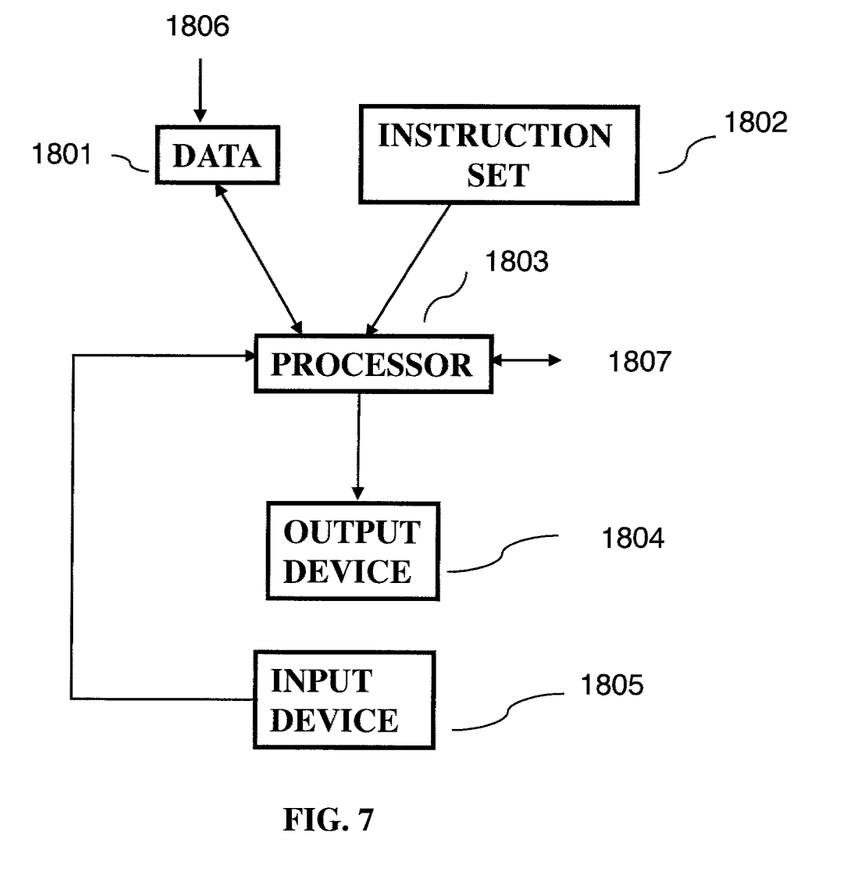
FIG. 7 illustrates a system in accordance with an aspect of the present invention.

Whenever the online one-point calibration is initiated, referring to FIG. 6, the following steps are performed:
1. Displaying of one visual marker 806 at a known position on the screen 800 (for instance on the screen center);
2. Ensuring that the user fixates on this point (for a cooperative user this can be triggered by a small waiting time after displaying the marker);
3. Determining where the user is gazing with the frames. In the case of FIG. 6, the user is gazing at point 802 along the vector 804. Since the user should be gazing at point 806 along vector 808, there is a vector $\Delta e$ that can calibrate the system.
4. The next step is determining the vector $\Delta e$ between the actual known point 806 on-screen location from step 1 and the reprojected gaze direction 802/804 from the system in screen coordinates.
5. Further determinations of where the user is gazing are corrected by the vector $\Delta e$.

This concludes the one-point recalibration process. For subsequent estimations of the gaze locations, their on-screen reprojection is compensated by $\Delta e$ until a new one-point recalibration or a new full calibration is initiated.

Additional points can also be used in this re-calibration step, as needed.

The methods as provided herein are, in one embodiment of the present invention, implemented on a system or a computer device. A system illustrated in FIG. 6 and as provided herein is enabled for receiving, processing and generating data. The system is provided with data that can be stored on a memory 1801. Data may be obtained from a sensor such as a camera which includes and one or more endo cameras and an exo camera or may be provided from a data source. Data may be provided on an input 1806. Such data may be image data or positional data, or any other data that is helpful in a vision and display system. The processor is also provided or programmed with an instruction set or program executing the methods of the present invention is stored on a memory 1802 and is provided to the processor 1803, which executes the instructions of 1802 to process the data from 1801. Data, such as image data or any other data provided by the processor can be outputted on an output device 1804, which may be a display to display data or a data storage device. For instance image data that falls within a predefined area of a gaze of a user and that is associated with the calibration methods as disclosed herein, may be displayed on a screen 1804 or at least temporarily stored in a memory. The output device 1804 in one embodiment is a screen or display where upon the processor projects known images which are recorded by an exo-camera and associated with coordinates in the calibrated space as defined by the methods provided as an aspect of the present invention. The processor also has a communication channel 1807 to receive external data from a communication device and to transmit data to an external device. The system in one embodiment of the present invention has an input device 1805, which is the eye-frame as described herein and which may also include a keyboard, a mouse, a pointing device, one or more cameras or any other device that can generate data to be provided to processor 1803.

The processor can be dedicated hardware. However, the processor can also be a CPU or any other computing device that can execute the instructions of 1802. Accordingly, the system as illustrated in FIG. 6 provides a system for data processing resulting from a sensor, a camera or any other data source and is enabled to execute the steps of the methods as provided herein as an aspect of the present invention.

Thus, a system and methods have been described herein for at least for Geometric Calibration of Head-Worn Multi-camera Eye Tracking.

In one embodiment of the present invention the calibrated wearable camera is used to determine where a gaze of user wearing the wearable camera is directed to. Such a gaze may be a voluntary or determined gaze, for instance directed at an intended object or an intended image displayed on a display. A gaze may also be an involuntary gaze by a wearer who is attracted consciously or unconsciously to a particular object or image.

By providing coordinates of objects or images in a calibrated space the system can be programmed to determine at which image, object or part of an object a wearer of the camera is looking at by associating the coordinates of an object in the calibrated space with the calibrated direction of gaze. The gaze of the user on an object, such as an image on a screen, can thus be used for initiating computer input such as data and/or instructions. For instance images on a screen can be images of symbols such as letters and mathematical symbols. Images can also be representative of computer commands. Images can also be representative of URLs. A moving gaze can also be tracked to draw figures. Accordingly, a system and various methods are provided that enable a user's gaze to be used to activate a computer at least similar to how a user's touch activates a computer touch screen.

In one illustrative example of a voluntary or intentional gaze, the system as provided herein displays a keyboard on a screen or has a keyboard associated with the calibration system. Positions of the keys are defined by the calibration and a system thus recognizes a direction of a gaze as being associated with a specific key that is displayed on a screen in the calibration space. A wearer thus can type letters, words or sentences by directing a gaze at a letter on a keyboard which is for instance displayed on the screen. Confirming a typed letter may be based on the duration of the gaze or by gazing at a confirmation image or key. Other configurations are fully contemplated. For instance, rather than typing letters, words or sentences a wearer may select words or concepts from a dictionary, a list, or a database. A wearer may also select and/or construct formulas, figures, structures and the like by using the system and methods as provided herein.

As an example of an involuntary gaze, a wearer may be exposed to one or more objects or images in the calibrated vision space. One may apply the system to determine which object or image attracts and potentially holds the attention of a wearer who has not been instructed to direct a gaze.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for calibrating a frame worn by a wearer containing an exo-camera directed to a display that is not worn by the wearer and a first and a second endo-camera, each directed to an eye of the wearer, comprising:
a processor collecting data related to a projection of an image with a plurality of calibration points on the display with a known set of 3D coordinates in coordinates of the exo-camera directed to the display and in coordinates of the endo-camera as an exo-endo pair;
the processor optimizing a relative pose of the exo-endo pair as a set of rotation and translation parameters which minimizes an error criterion;
the processor estimating parameters of a geometric model of the eye while a gaze by the eye in an unobstructed manner focuses on a known location on the display;
the processor minimizing a gaze projection error on the display with regard to a known ground truth; and
the processor determining a relative transformation between an endo-camera coordinate system and an exo-camera coordinate system; and wherein the relative transformation is expressed as:

$$p^x = R^{ex} p^e \, t^{ex} +$$

wherein
$R^{ex} \in SO(3)$ is a rotation matrix, wherein $SO(3)$ is a rotation group,
$t^{ex} \in R^3$ is a translation vector,
$p^x \in R^3$ is a vector of points in the exo camera coordinate system, and
$p^e \in R^3$ is a vector of points in the endo camera coordinate system.

2. The method of claim 1, wherein a first exo-camera and endo-camera pair is formed for the first endo-camera and a second exo-camera and endo-camera pair is formed for the second endo-camera.

3. The method of claim 1, wherein:
calibration grids $G^e$, $G^x$ are placed around the endo-exo camera system such that $G^x$ is visible in the exo camera image and $G^e$ is visible in the endo camera image.

4. The method of claim 1, wherein for each image establishing an exo-camera and endo-camera pair external pose matrices $T_n^e \in R^4 \times R^4$ and $T_n^e \in R^4 \times R^4$ are estimated from marked projected calibration points, wherein:

$T_n^e$ is a endo-camera external pose matrix for image pair n, and
$T_n^e$ is a exo-camera external pose matrix for image pair n.

5. The method of claim 4, wherein the error criterion is determined by an optimization of an expression $$\sigma^2 = \sum_{n=1}^{N} [\{\text{Var}(p_n^x)\}], \; p_n^x = (T_n^x)^{-1} \tilde{T}^{ex} T_n^e p^e,$$

wherein:
$\tilde{T}^{ex}$ is an estimation of $T^{ex} \in R^4 \times R^4$ which is a transformation matrix for homogeneous coordinates.

6. The method of claim 1, wherein
the processor estimates the parameters of the of the geometric model of the eye by minimizing a projection error of an estimated intersection point of the direction of gaze with the display relative to an actual intersection point.

7. The method of claim 1, further comprising:
minimizing a residual error between an estimated location on a display and an actual location on a display by estimating a homography.

8. The method of claim 6, wherein the minimizing of the projection error generates estimated parameters that calibrate the frame relative to the display.

9. The method of claim 8, wherein the estimated parameters are $\tilde{T}^{ex}$, $\tilde{c}$ and $\tilde{r}$, wherein
$\tilde{T}^{ex}$ is an estimation of a transformation matrix for homogeneous coordinates;
$\tilde{c}$ is an estimate of a center of the eye; and
$\tilde{r}$ is an estimate of a radius of the eye.

10. The method of claim 1, further comprising:
the wearer after calibration looking at the screen and the processor determining from a post calibration exo-camera image and endo-camera image pair a coordinate on the display.

11. The method of claim 10, wherein a gaze of the wearer is applied to provide a command to a computing device.

12. A method for calibrating a frame worn by a wearer containing an exo-camera directed to a display and a first and a second endo-camera, each directed to an eye of the wearer, comprising:
a processor collecting data related to a projection of an image on the display with a known set of 3D coordinates in coordinates of the exo-camera and in coordinates of the endo-camera as an exo-endo pair;
the processor optimizing a relative pose of the exo-endo pair as a set of rotation and translation parameters which minimizes an error criterion;
the processor estimating parameters of a geometric model of the eye while it focuses on a known location in the 3D screen space;
the processor minimizing a gaze projection error on the display with regard to a known ground truth, and wherein
the processor determines a relative transformation between an endo-camera coordinate system and an exo-camera coordinate system, the relative transformation is expressed as:

$$p^x = R^{ex} p^e \, t^{ex} +$$

wherein
$R^{ex} \in SO(3)$ is a rotation matrix, wherein $SO(3)$ is a rotation group,
$t^{ex} \in R^3$ is a translation vector, $p^x \in R^3$ is a vector of points in the exo camera coordinate system, and $p^e \in R^3$ is a vector of points in the endo camera coordinate system.

13. The method of claim 12, wherein:
calibration grids $G^e$, $G^x$ are placed around the endo-exo camera system such that $G^x$ is visible in the exo camera image and $G^e$ is visible in the endo camera image.

14. The method of claim 12, wherein for each image establishing an exo-camera and endo-camera pair external pose matrices $T_n^e \in R^4 \times R^4$ and $T_n^x \in R^4 \times R^4$ are estimated from marked projected calibration points, wherein:

$T_n^e$ is a endo-camera external pose matrix for image pair n, and $T_n^x$ is a exo-camera external pose matrix for image pair n.

15. The method of claim 14, wherein the error criterion is determined by an optimization of an expression $$\sigma^2 = \sum_{n=1}^{N} [\{\text{Var}(p_n^x)\}], \; p_n^x = (T_n^x)^{-1} \tilde{T}^{ex} T_n^e p^e,$$

wherein:

$\tilde{T}^{ex}$ is an estimation of $T^{ex} \in R^4 \times R^4$ which is a transformation matrix for homogeneous coordinates.

16. A method for calibrating a frame worn by a wearer containing an exo-camera directed to a display that is not worn by the wearer and a first and a second endo-camera, each directed to an eye of the wearer, comprising:

a processor collecting data related to a projection of an image with a plurality of calibration points on the display with a known set of 3D coordinates in coordinates of the exo-camera directed to the display and in coordinates of the endo-camera as an exo-endo pair;

the processor optimizing a relative pose of the exo-endo pair as a set of rotation and translation parameters which minimizes an error criterion;

the processor estimating parameters of a geometric model of the eye while it focuses on a known location on the display;

the processor minimizing a gaze projection error on the display with regard to a known ground truth; and the processor minimizing a residual error between an estimated location on a display and an actual location on a display by estimating a homography, wherein the estimated homography is expressed as:

$$d = H\tilde{d},$$

wherein:

d is the actual location on the display, $\tilde{d}$ is the estimated location on the display, and H is a matrix that determines a homography.

17. The method of claim 16, wherein the minimizing of the projection error generates estimated parameters that calibrate the frame relative to the display and wherein the estimated parameters are $\tilde{T}^{ex}$, $\tilde{c}$ and $\tilde{r}$, wherein $\tilde{T}^{ex}$ is an estimation of a transformation matrix for homogeneous coordinates;

$\tilde{c}$ is an estimate of a center of the eye; and $\tilde{r}$ is an estimate of a radius of the eye.

* * * * *